United States Patent
Borla

(10) Patent No.: US 9,850,798 B1
(45) Date of Patent: Dec. 26, 2017

(54) AUTO THROTTLE AND EXHAUST FLOW CONTROL MODULE CONSTRUCTION

(71) Applicant: Alexander Borla, Jonesborough, TN (US)

(72) Inventor: Alexander Borla, Jonesborough, TN (US)

( * ) Notice: Subject to any disclaimer, the term of this patent is extended or adjusted under 35 U.S.C. 154(b) by 0 days.

(21) Appl. No.: 14/999,269

(22) Filed: Apr. 15, 2016

Related U.S. Application Data

(63) Continuation-in-part of application No. 14/545,858, filed on Jun. 29, 2015.

(51) Int. Cl.
| | |
|---|---|
| *F01N 13/08* | (2010.01) |
| *F16K 3/04* | (2006.01) |
| *F16K 31/12* | (2006.01) |
| *F16K 27/04* | (2006.01) |

(52) U.S. Cl.
CPC .............. *F01N 13/08* (2013.01); *F16K 3/04* (2013.01); *F16K 27/045* (2013.01); *F16K 31/12* (2013.01)

(58) Field of Classification Search
CPC ........ F01N 13/08; F01N 1/165; F16K 27/045; F16K 31/12; F16K 3/04; F16K 27/04
USPC ........................................ 123/336, 337, 442
See application file for complete search history.

(56) References Cited

U.S. PATENT DOCUMENTS

| | | | |
|---|---|---|---|
| 6,679,289 B2 * | 1/2004 | Sisk ...................... | F16K 15/033 |
| | | | 137/315.16 |
| 2011/0120414 A1 * | 5/2011 | Quantz .................... | F02D 9/16 |
| | | | 123/337 |

* cited by examiner

*Primary Examiner* — Craig Schneider
*Assistant Examiner* — Nicole Gardner

(57) ABSTRACT

A fluid flow control unit, in a preferred embodiment, mounted on a section of pipe having a tubular wall forming a fluid flow passage with a flow axis, the unit having a gate section, and a gate pivot section, the pivot section having a body portion mounted on the pipe outer wall surface, a gate mounting cavity formed in the body portion and opening through the pipe wall and providing an access port for the gate section to the mounting cavity, a pivot shaft positioned in the cavity and mounted on bearing structure on the body portion, the diameter of the shaft being dimensioned to allow a laterally curved gate which is affixed to a surface portion of the shaft to pivot up against a ceiling of the pipe to thereby be out of the flow passage main stream at a full open, non-blocking position of the gate, and a gate position control structure on the unit for allowing predetermined degrees of rotation of the pivot shaft in response to the magnitude of fluid flow pressure forces directed against the gate.

5 Claims, 13 Drawing Sheets

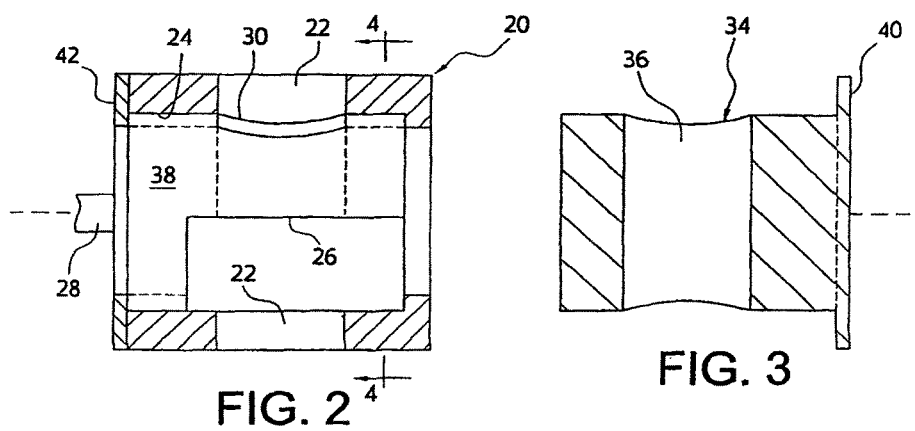
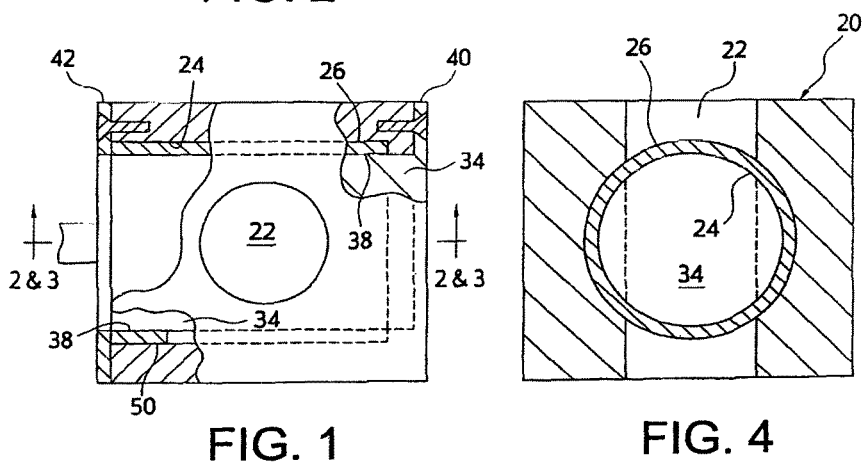
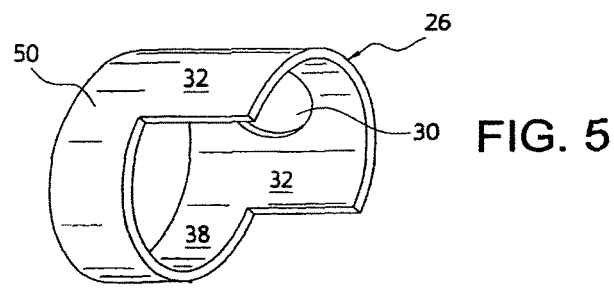

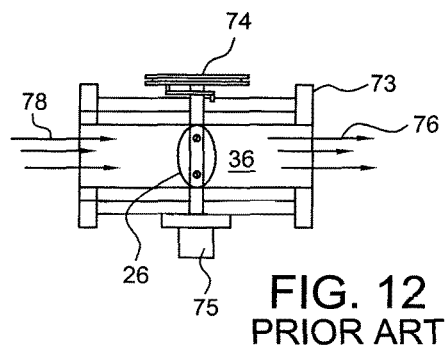
FIG. 12
PRIOR ART
FIG. 12A
PRIOR ART
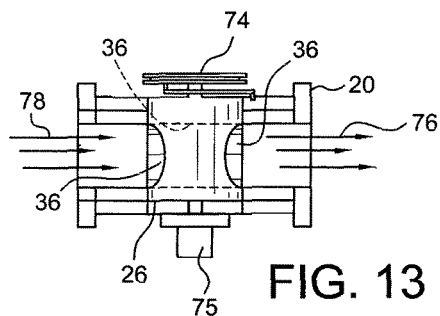
FIG. 13
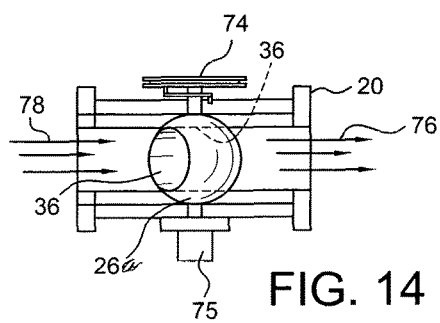
FIG. 14

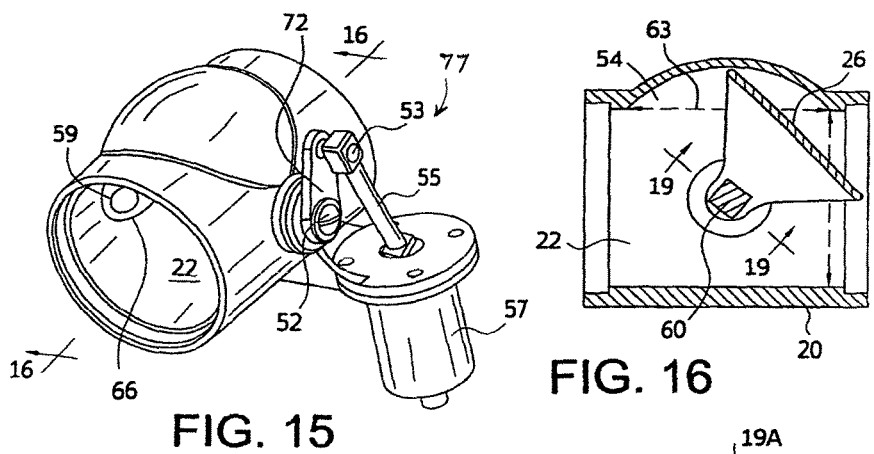
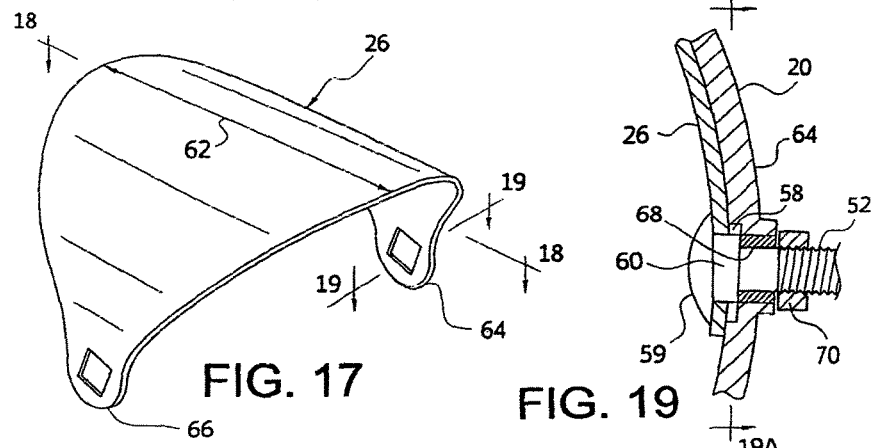
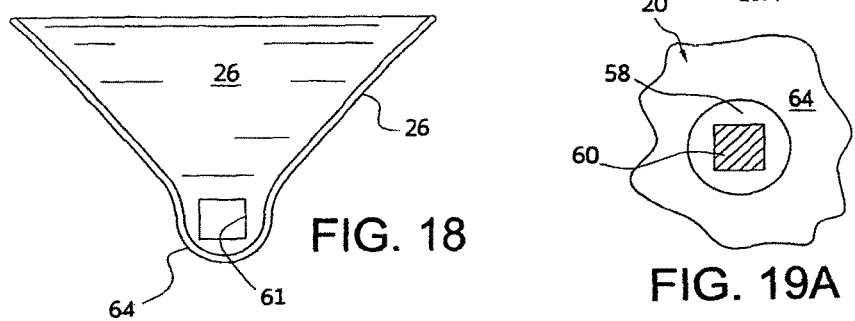

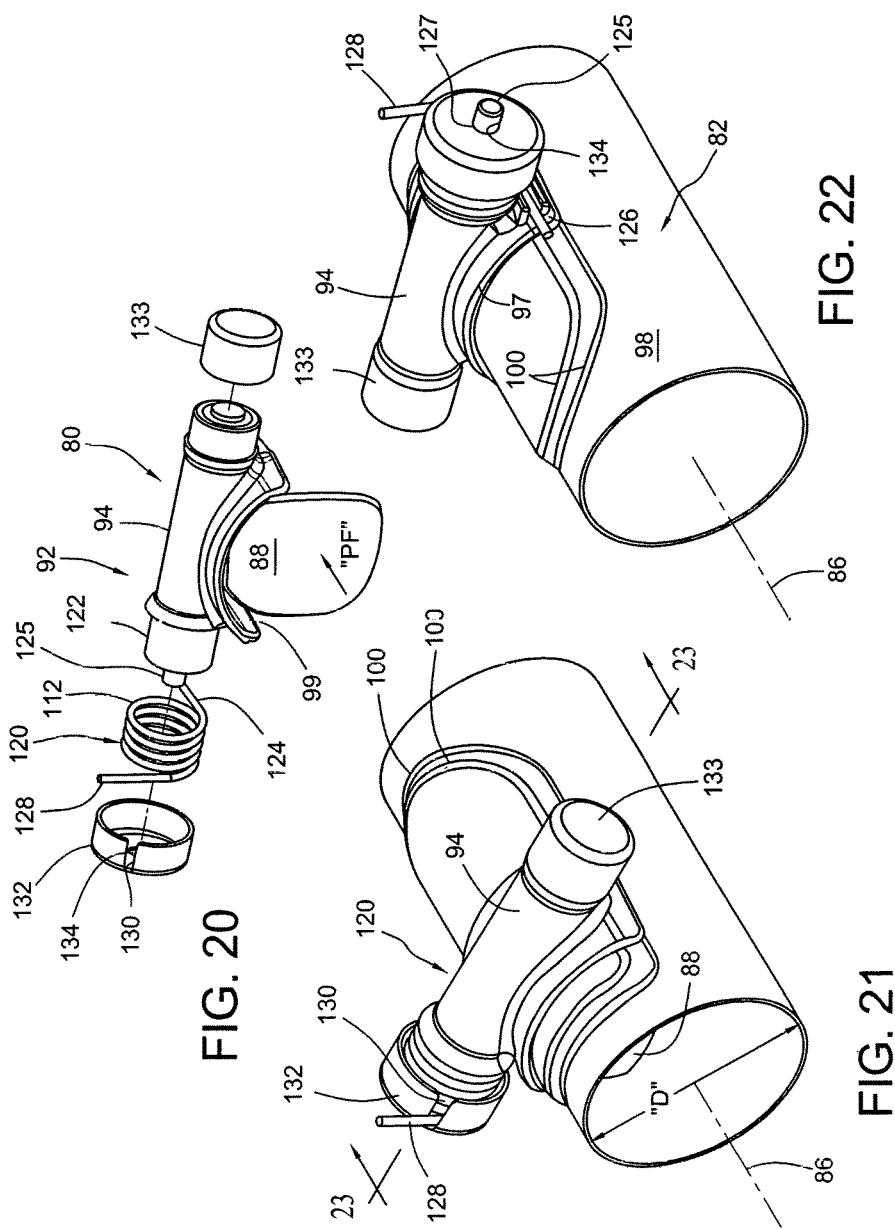

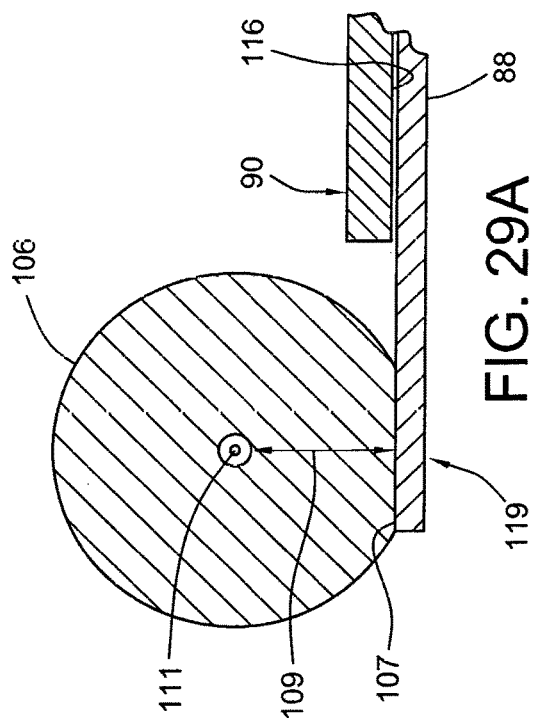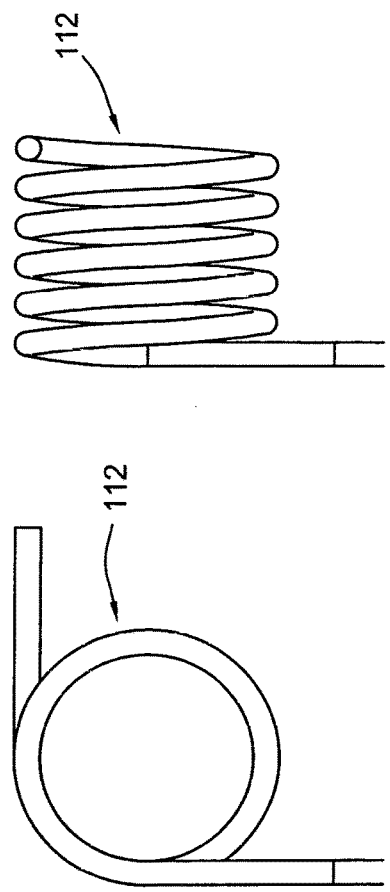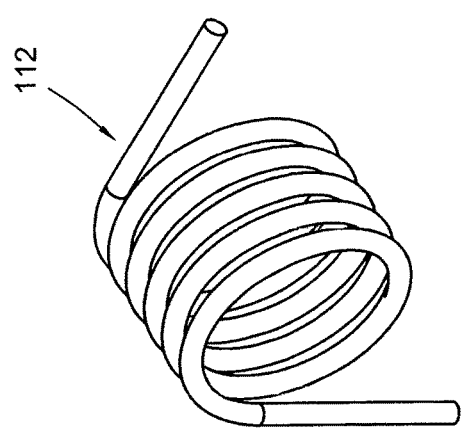
FIG. 29A
FIG. 30A
FIG. 30B
FIG. 30

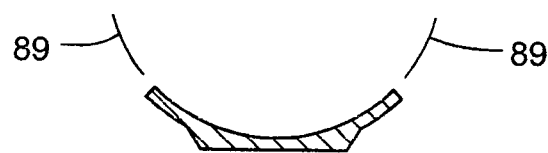
FIG. 32B
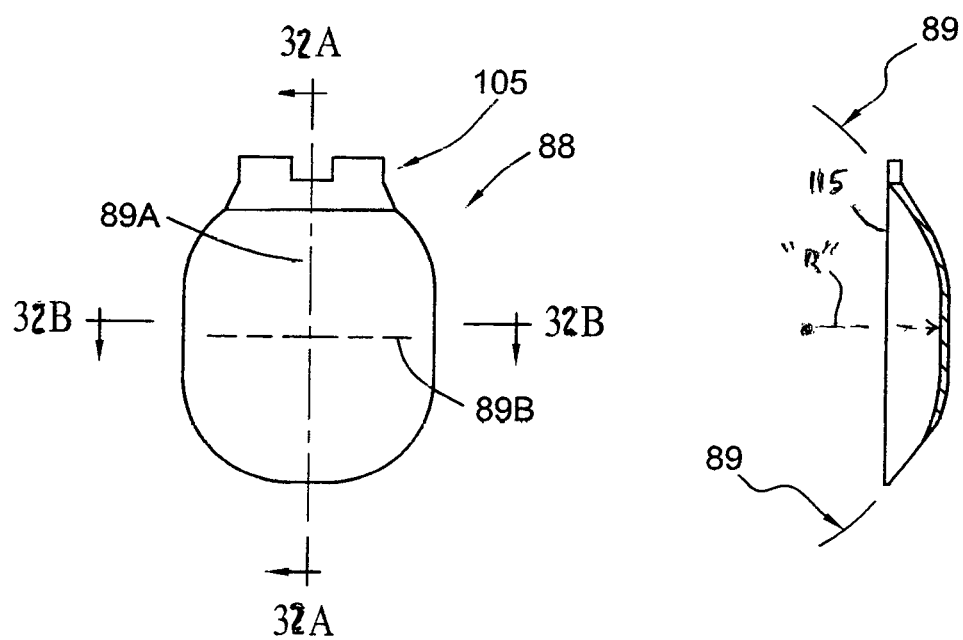
FIG. 32
FIG. 32A

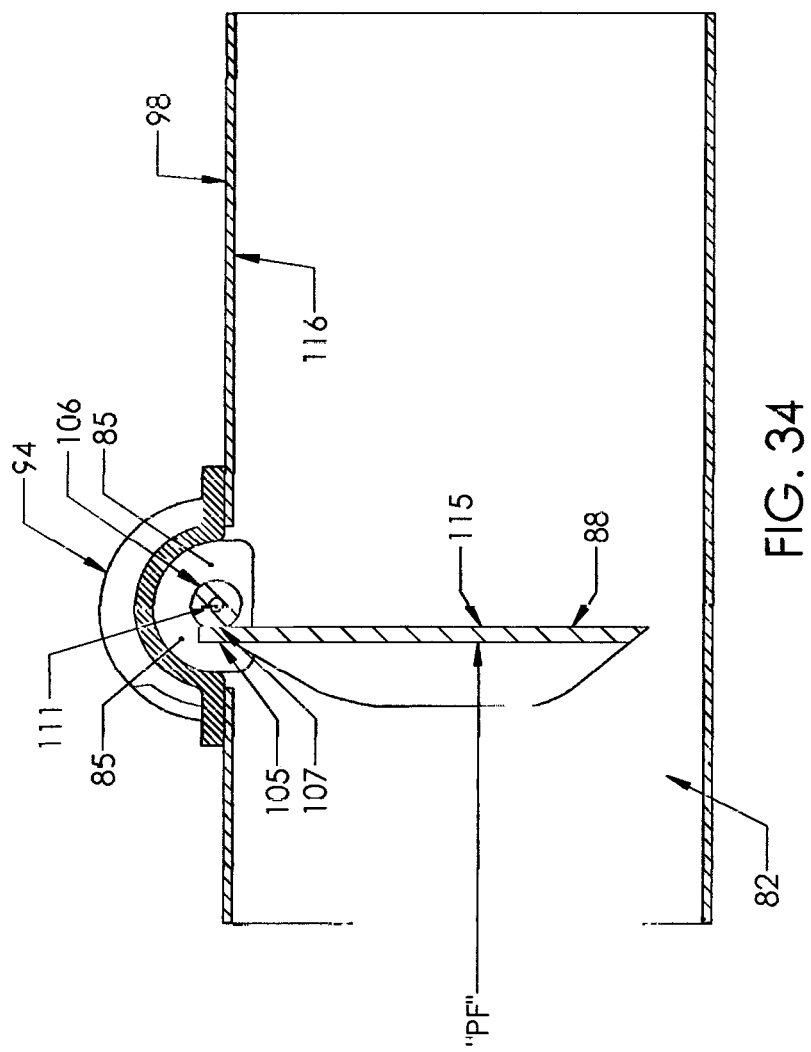

US 9,850,798 B1

AUTO THROTTLE AND EXHAUST FLOW CONTROL MODULE CONSTRUCTION

This application is a Continuation-in-Part (CIP) Application of Applicant's Patent Application entitled AUTO THROTTLE AND EXHAUST FLOW CONTROL MODULE CONSTRUCTION Ser. No. 13/986,055 filed Mar. 28, 2013, and of CIP application Ser. No. 14/545,858 filed Jun. 29, 2015, of the same title.

BACKGROUND

Field

This invention is in the field of devices for regulating the flow of fluid, e.g., liquid or gasses as the result of positive or negative pressures and which may contain entrained particulates. The present device is particularly useful in automotive carburetion and exhaust systems.

Prior Art

In internal combustion engines the use of a throttle body that meters and measures the intake air to the engine is a standard. As the driver accelerates manually, or via cruise control, a throttle plate pivotally mounted in the throttle body throat is opened to a desired degree which allows air to pass through the throat in a controlled volume. The volume is measured with a throttle position sensor and mass air (fluid) flow sensor mounted to the throttle body and fed back to a computer (ECM) in the auto where the desired (e.g., most efficient) fuel air ratio is determined.

Similarly and importantly, such gas flow throttling means is often employed in exhaust systems to measure and control various physical and/or chemical characteristics and conditions of exhaust gases in order, e.g., to provide computer data for determining the most efficient back pressure and position of the exhaust throttle plate or gate. Such exhaust flow control data can also be useful for cooperatingly regulating air/fuel ratio and composition of the exhaust gas such as $NO_x$, $CO$, $CO_2$, sulfur oxides and the like content.

As desirous and necessary as such throttling is however, the throttle structures presently available, e.g., for both intake and exhaust systems, have experienced a significant drawback in that these structures typically employ a round metal planar throttle plate (butterfly) which is pivotally mounted on its broad plane along or near its diameter on a pivot shaft which is positioned in the engine air intake throat or exhaust passage formed through the throttle body or exhaust pipe. This shaft is pivotally journaled at its ends in opposite sides of the throttle body or exhaust pipe. In use, for example in the fuel intake system, such a throttle structure when actuated for higher engine demands, e.g., by depression of an accelerator pedal linked by lever means to the pivot shaft, can rotate the throttle plate from about 0 to about 90 degrees, with zero degrees blocking about 100% of the intake flow and at ninety degrees allowing—in prevailing terms—"full intake flow". Similarly, when used in an exhaust system, the position of the butterfly structure can be regulated, e.g., by means of a torsion spring or by any of the known electronic control means such as shown, e.g., in U.S. Pat. No. 6,085,722 the disclosure of which is hereby incorporated herein by reference in its entirety. These prior valve structures, however encounter a major problem in that since the throttle plate (butterfly) and pivot shaft are positioned directly in the throat and are fluid flow typically pivotally center mounted on the diameter thereof, the fluid flow becomes and remains divided as the plate opens. At full open, the plate and its pivot shaft are still in the fluid flow path and partially block the intake flow and, in addition through creating a plurality of contiguous pressure zones, causes turbulences which, e.g., reduce intake fuel/air density, intake flow volume and flow velocity. It is particularly noted that in situations where heavy duty and large throttle plate and pivot shaft are required, the fluid flow volume blockage and turbulence caused by their exaggerated dimensions become quite material to engine performance.

SUMMARY OF THE PRESENT INVENTION

The present invention alleviates the aforesaid throttle problems and in a preferred embodiment for automotive use is summarized as an automotive fluid flow throttle unit adapted for mounting in the exhaust system e.g., exhaust pipe of internal combustion engines, wherein the unit is affixed e.g., by welding 87 in between two sections 91, 93 of the exhaust pipe wherein a flow regulating throttle gate is formed with a connection neck portion which is mounted on a pivot shaft at a connection point on the shaft located a predetermined distance laterally of the rotation axis of the shaft, wherein the shaft is pivotally mounted on bearing means positioned on the exterior surface of the pipe section wall and outside of the flow passage within the pipe and is adapted for pivoting the throttle gate within the pipe passage between an open and a closed by means of said connection neck passing through an aperture in the exhaust pipe wall flow attenuating positions in the passage, wherein the pivot mounting structure for the gate allows the gate (1) to be pivoted completely out of the pipe passage and into a pocket cavity outwardly formed in the pipe wall, or (2) to be pivoted at full gate opening, up adjacent to the inner wall surface of the pipe wall.

The above throttle unit is affixed onto the pipe sections, e.g., by to welding or flange type connection or the like into fore and aft sections of an exhaust pipe. In the present structures the longer flow force reaction arm of the plate or gate, i.e., resulting from its edgewise mounting to the pivot shaft maximizes the positive fluid flow pressure response area of the valve. Also, in the present invention there is no counter pressure as is generated by the upper portion of a conventional butterfly valve, thus eliminating valve plate oscillation, an further, the pivot mechanisms, bearings and other components of the pivot section are outside of the exhaust flow path, thereby reducing thermal exposure and contact of these components with corrosive gases and liquids to which prior exhaust valve structures are commonly exposed.

In the embodiments, in particular, of FIGS. 15-32B, at full open engine running the valve plate or gate retracts into the pocket which is completely recessed out of the stream of fluid flow. This provides unrestricted path through the valve for linear flow of the fluid and reduces back pressure. In a preferred embodiment the gate is curved to match the roof inner surface radius of the pocket section. This shape further aids in focusing the stream of fluid through the valve for improving the flow constancy and flow linearity during engine operation and for reducing noise. The shaft and pivots are outside the stream of fluid flow, and provides unrestricted flow. Further and preferably, the gate has a set gap at its bottom edge, and at its left and right edges which eliminates gate oscillation, noise and binding.

The present throttle unit construction allows the control gate (plate) to have any of a variety of configurations wherein the plate can be, e.g., spherical, semi-spherical, cylindrical, rectangular, semi-cylindrical, e.g., a sphere, partial sphere, ball, cylinder, or a flat plate, but most preferably a plate curved laterally to nest up against the present arcuate ceiling of the pocket section as is shown in detail herein in FIG. 30. The spherical or cylindrical embodiments can be match drilled to a bore diameter of the fluid intake or exhaust passage. In these embodiments the throttle plate is mounted preferably on the module body by two external pivot bearings on opposite sides of the module body leaving the bore completely unrestricted. The intake or exhaust flow at full open would be increased to 100% and be more laminar than previously was possible at partial open throttle conditions.

The present throttle module embodiment when placed in an auto exhaust system can control, for example, the exhaust flow volume, the exhaust back pressure and the exhaust flow velocity.

The invention is shown in the accompanying drawings in certain preferred embodiments of the present exteriorly mounted throttle plate, wherein substantially equivalent structures maybe numbered the same and wherein the Figs. are not drawn to scale or necessarily in the same structural proportions, and wherein:

FIG. 1 is a top down view of relevant portions of a throttle body showing the present air (fluid) intake or exhaust thru passage, with portions of the throttle body broken away and portions shown in relief to show sections of the present cylindrical embodiment of the throttle member or plate and the through passage extension mandrel;

FIG. 2 is a cross-sectional view taken along line 2-2 in FIG. 1 and showing portions of the throttle body and portions of the tubular embodiment of the present throttle plate;

FIG. 3 is an isolated cross-sectional view of the present intake air or exhaust extension passage mandrel taken along line 3-3 in FIG. 1;

FIG. 4 is a cross-sectional view taken along line 4-4 in FIG. 2;

FIG. 5 is a perspective view of one embodiment the present cylindrical throttle plate;

Figure 6:
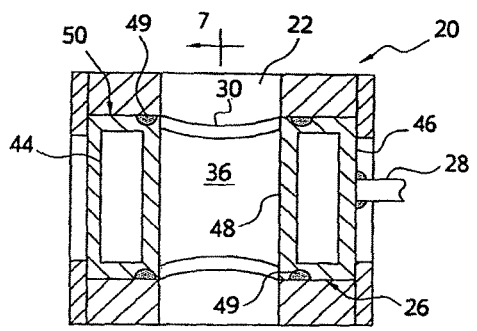
FIG. 6 is a cross-sectional view as in FIG. 2 showing a variation in the exteriorly mounted throttle plate.
Figure 7:
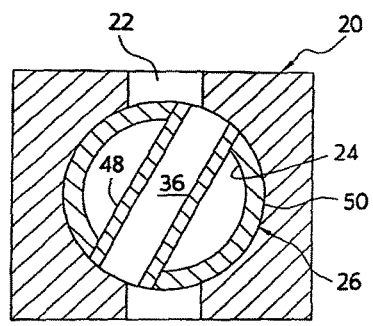
Figure 9A:
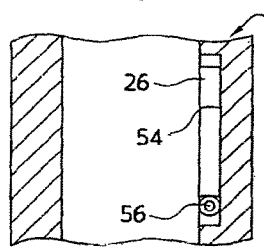
Figure 9:
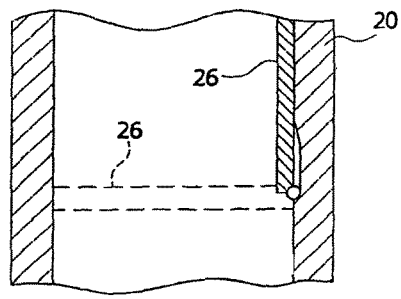
Figure 8:
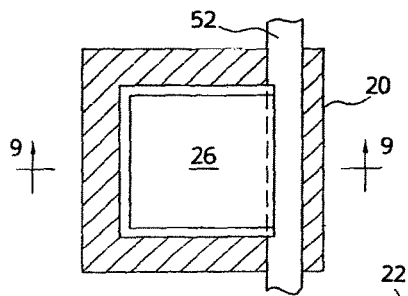
Figure 10:
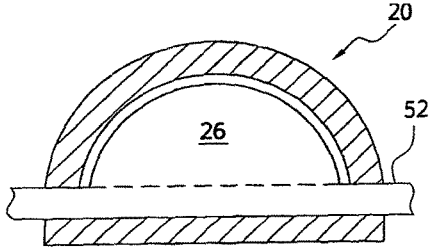
Figure 11:
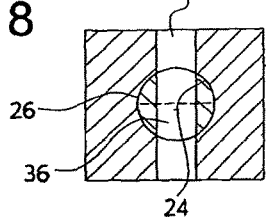
Figures 23, 25:
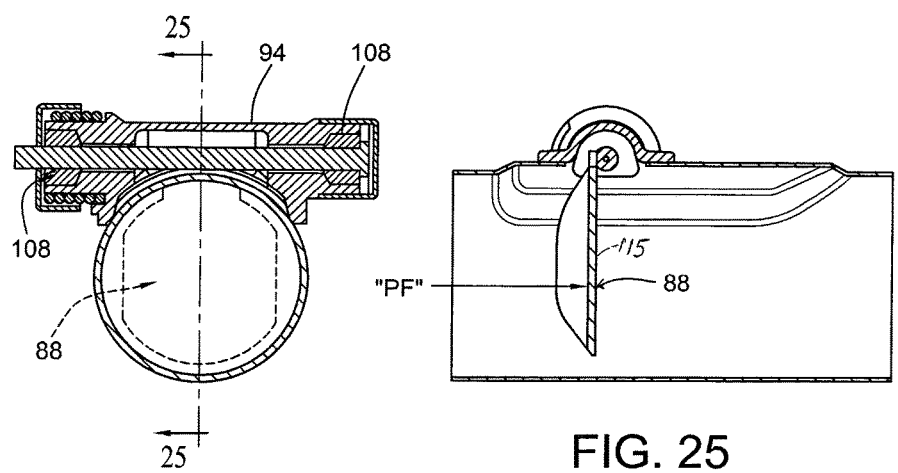
Figure 24:
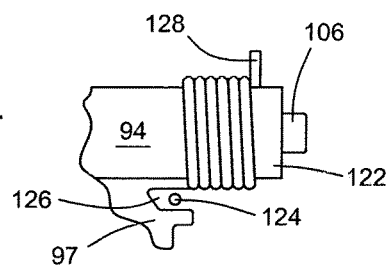
Figure 26:
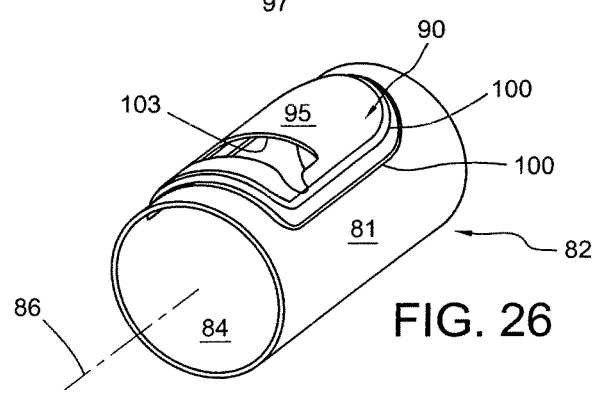
Figure 27:
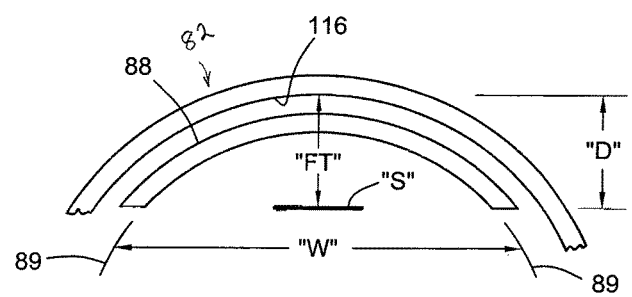
Figure 28:
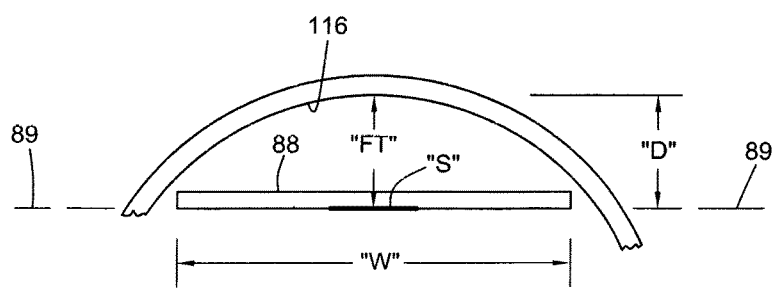
Figure 29:
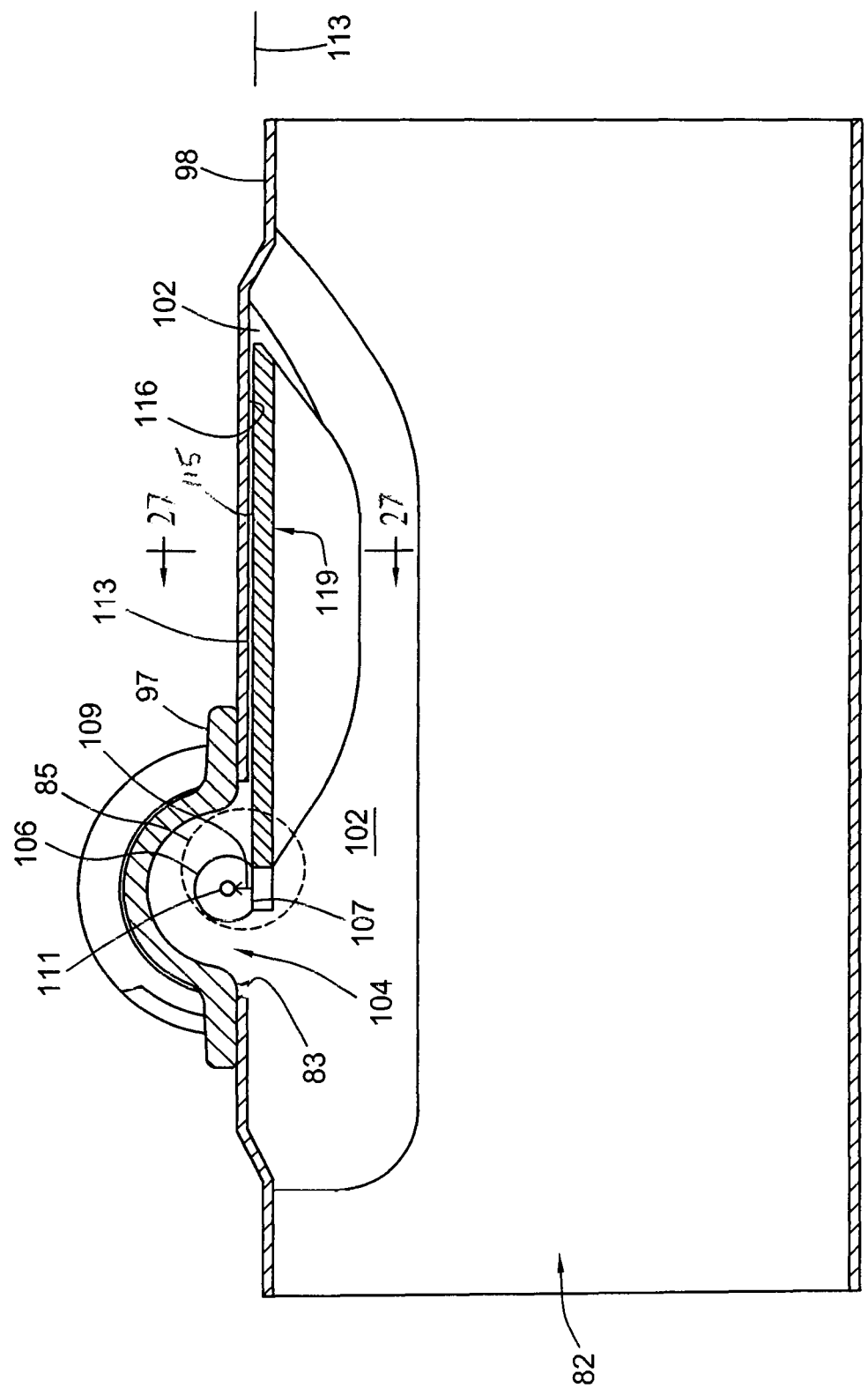
Figure 31:
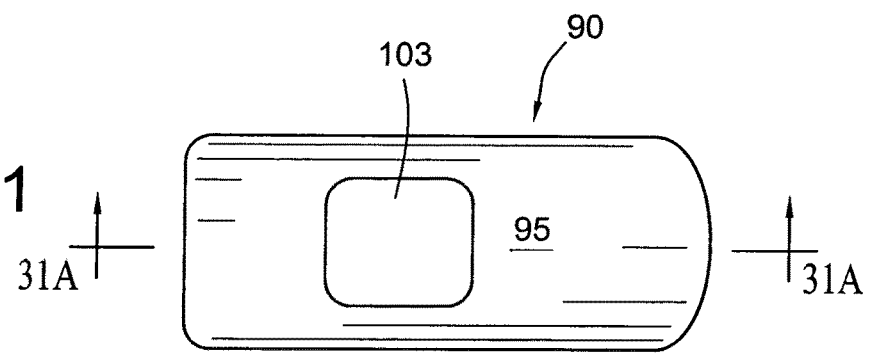
Figure 31A:
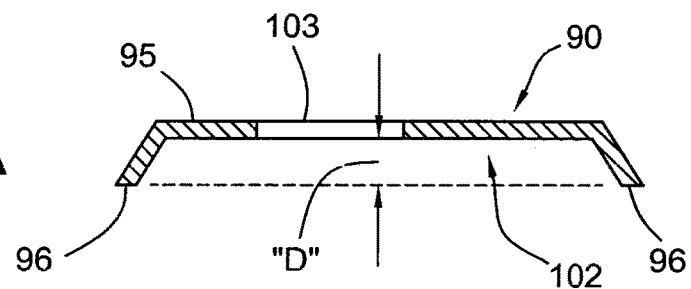
Figure 33:
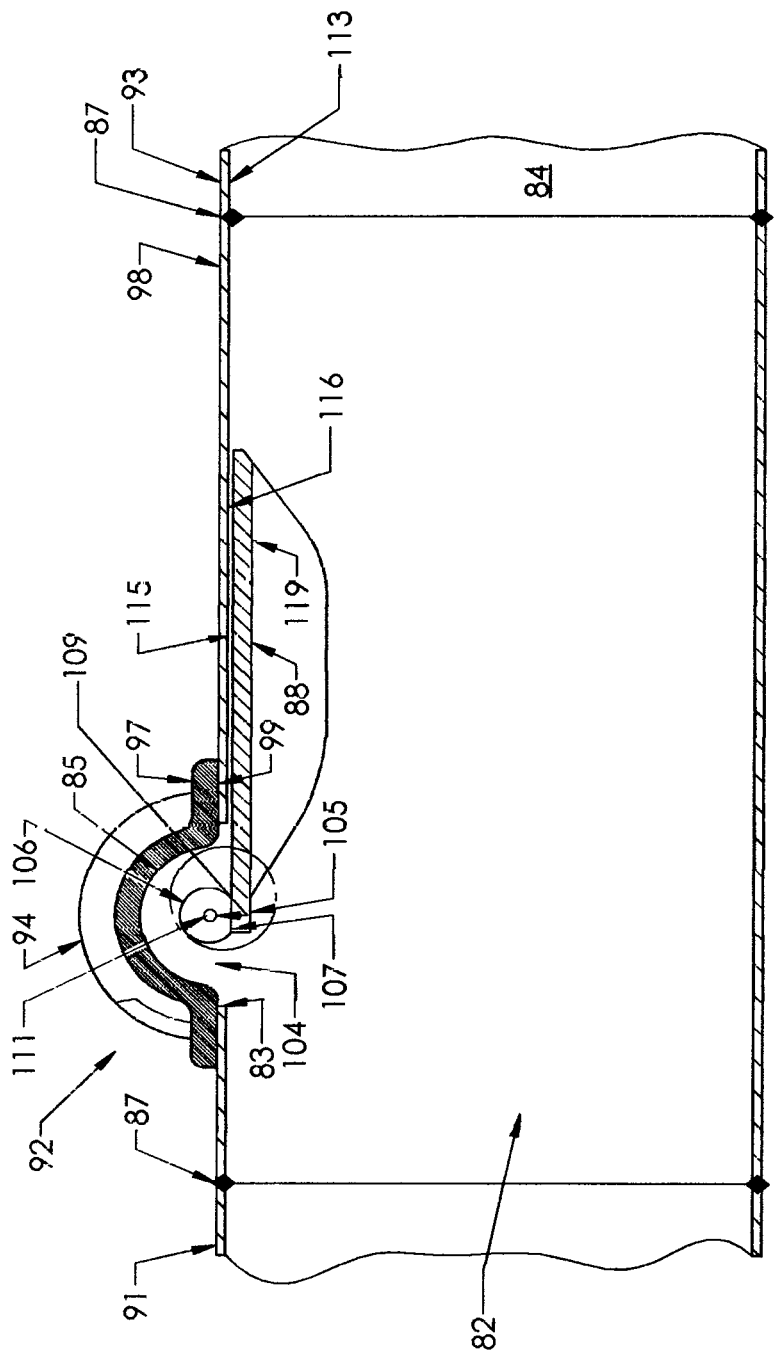

FIG. 7 is a cross-sectional view taken along line 7-7 in FIG. 6 with cylinder 50 rotated to a partial blocking position of passage 22 and passage extension 36;

FIG. 8 is a top down view of a variation in configuration of the present exteriorly mounted throttle plate;

FIG. 9 is a cross-sectional view taken along line 9-9 in FIG. 8;

FIG. 9A is a view as in FIG. 9 and showing a variation in throttle plate placement;

FIG. 10 is a top down, partially cross-sectional view as in FIG. 8 and showing a semi-circular throttle plate design;

FIG. 11 is a cross-section as in FIG. 2 showing a hemisphere (dotted line), or sphere shaped throttle plate;

FIGS. 12 and 12A show a conventional throttle plate construction;

FIG. 13 shows an embodiment of the present throttle plate as a cylinder;

FIG. 14 shows a ball shaped throttle plate;

FIG. 15 is an isometric view of the present module;

FIG. 16 is a cross-sectional view taken along line 16-16 in FIG. 15;

FIG. 17 is an isometric view of the throttle plate shown in FIG. 16;

FIG. 18 is a cross-sectional view of the throttle plate taken along line 18-18 in FIG. 17;

FIG. 19 is an enlarged cross-sectional view taken along line 19-19 in FIG. 16 and showing one useful structure for non-rotatably mounting the throttle plate of FIG. 16 on the opposing shafts;

FIG. 19A is a cross-sectional view taken along line 19A-19A in FIG. 19 with one pivot shaft shown in an embodiment of useful pivot shaft means;

FIG. 20 is an isometric exploded view of a preferred embodiment of the pivot section of the present control unit;

FIG. 21 is an isometric view of the flow control module with the present throttle unit affixed to the exterior of the tubular wall of the control module pipe section;

FIG. 22 is an isometric view as in FIG. 20 rotated 180° in the plane of the drawing;

FIG. 23 is a cross-sectional view taken along line 23-23 in FIG. 21;

FIG. 24 is a view taken along line 24-24 in FIG. 22 with the spring retainer cover removed and further showing the anchoring structure on the throttle unit for the stationary end of the torsion spring;

FIG. 25 is a cross-sectional view taken along line 25-25 in FIG. 23 and showing a laterally and longitudinally curved, i.e., cupped gate plate in a flow blocking position in the pipe section;

FIG. 26 is an isometric view of the tubular wall of the module pipe section, and of the roof wall of the pocket section of the throttle unit showing the registered apertures through which the gate plate connector portion of the gate plate protrudes and enters into the pivot section of the throttle unit;

FIG. 27 is a cross-sectional view taken along line 27-27 in FIG. 29 and showing the required depth "D" of the pocket cavity for a laterally curved gate plate;

FIG. 28 is a view as in FIG. 27 for a flat gate plate;

FIG. 29 is a cross-sectional view as in FIG. 25 but showing a structural variation of a gate plate in a nested non-blocking position in a pocket cavity which is formed by outward deformation of the wall of a section of auto exhaust pipe;

FIG. 29A is an enlarged area dotted in FIG. 29;

FIG. 30 is a perspective view of the pivot section torsion spring;

FIG. 30A is an end view of FIG. 30;

FIG. 30B is a side view of FIG. 30;

FIG. 31 is a top view of the pocket section;

FIG. 31A is a cross-sectional view taken along line 31A-31A in FIG. 31;

FIG. 32 is a front view of the cupped gate plate;

FIG. 32A is a cross-sectional view taken along line 32A-32A in FIG. 32;

FIG. 32B is a cross-sectional view taken along line 32B-32B in FIG. 32;

FIG. 33 is a view as in FIG. 29 showing an embodiment of the present invention wherein the offset connection of the throttle plate to the pivot shaft allows the throttle plate to lie adjacent to the pipe inner wall surface at full open throttle; and FIG. 34 is a view as in FIG. 33 showing the throttle plate in its closed position.

DETAILED DESCRIPTION

Referring to the drawings, particularly FIGS. 1-5, a throttle body 20 of suitable size and configuration is formed with an air passage 22 and a cylindrical throttle plate bore 24 for rotatably receiving the cylindrical throttle plate 26 which is shown in relief. This plate is provided with an axially rotatable throttle actuator shaft such as 28 adapted to be linked mechanically, electronically or hydraulically to the foot pedal of an automotive vehicle or actuator. Plate 26 and bore 24 are dimensioned to allow plate 26 to rotate freely but snugly within bore 24 to place intake or exhaust port 30 in plate 26 to any position between completely closing off and completely opening passage 22. The plate 26 may be shaped to have a more aerodynamic shape during the transition of closed to full open throttle. In this regard, the land area 32 on either side of port 30 is sufficiently large to completely close off passage 22.

A mandrel 34 is formed with an air intake passage extension 36 and is adapted to slidingly mount within the cylindrical inner surface 38 of plate 26. End cap structures such as 40 and 42 secured to body 20 retain the mandrel 34 and plate 26 respectively in place.

Referring to FIGS. 6 and 7, plate 26 takes the shape of a cylinder 50 provided with end caps 44 and 46 and having the air intake or exhaust port 30 provided by a pipe section 48 welded as at 49 to cylinder 50. This embodiment eliminates the need for mandrel 34.

Referring to FIGS. 8 and 9, plate 26 is pivotally mounted by shaft 52 such as to lie against body 20 in the full open throttle plate position.

In FIG. 9A, plate 26 is recessed in a cavity 54 formed in the inner wall surface of body 20 to utilize full flow in the full throttle mode. The placement of pivot shaft 56 allows plate 26 to so pivot into cavity 54.

Referring to FIGS. 12 and 12A, a conventional throttle body 73 and throttle plate are shown, the operation of which is controlled, for example, by linkage 74 to a foot pedal and throttle position sensor 75 to control air and fuel flow intake 78 and flow 76 to the engine wherein the throttle plate is center mounted in the body and as shown in FIG. 12A which causes a splitting and turbulence of the fuel-air flow and also a restriction to flow within the body 73.

As shown in FIG. 13, the use of a throttle plate in the shape of a cylinder 26, and in FIG. 14 in the shape of a ball 26a, wherein the fuel-air passage 36 is unobstructed in its open position, no such splitting and turbulence occurs and engine performance is enhanced noticeably.

Referring to FIGS. 15-19A the shape of throttle plate 26 is in the shape of a triangular section of a cylinder having a length 62, mounting ears 64 and 66 on opposing sides and having key holes 61 formed therethrough on an axis coextensive with the diameter line of the throttle body 20. A mounting mechanism for plate 26, in one embodiment comprises a carriage type of bolt or shaft 52 or equivalent for each mounting ear and having a head 59 and key structure 60 which fits snugly into key hole 61. A circular recess 58 in the wall of body 20 allows shaft 52 to rotate in bearing 68 and structure 60 to rotate in recess 58 to allow plate 26 to rotate in response to accelerator operation between a closed position and an open position 63, i.e., 0° to 90° (at full open). A lock nut 70 is lightened only against the outer end of the non-threaded portion of shaft 52 maintains the plate 26 in proper position while allowing it to rotate on the axis of 52. A throttle positioning device 77 having solenoids 57 (75), linkage 53, output shaft 55, and lever 72 can be used to pivot shaft 52 and plate 26 a desired degree.

Referring to FIGS. 20 through 30B, a most preferred embodiment of the present invention for special use in automotive exhaust systems wherein flow control valves are subjected to contact for long periods corrosive gasses at temperatures of 700 degrees or more, is shown as a fluid flow control throttle unit 80 for use in regulating the flow of any fluid including a gases, liquids, slurries, or the like and being mounted on a section of pipe 82 having a tubular wall 81 forming a fluid flow passage 84 with a flow axis 86. The throttle unit comprises a gate section 88 having a functional plane 89, a longitudinal axis 89A, and a lateral axis 89B, a pocket section 90, and a gate pivot section 92. The pivot section has a body 94 formed with a gate-to-shaft connector cavity 85 which is open at its bottom surface 83. A saddle portion 97 of the pivot section has a mounting surface 99 adapted in configuration to be mounted on the arcuate pocket section roof 95 and wherein the pocket section in turn has a perimetric mounting surface 96 configured to the shape of an exterior wall surface 98 of the pipe section 82. These surfaces 96 and 99 allow gas tight sealing joints 100 to be made readily between these sections and an exhaust pipe or other pipe section. A pocket cavity 102 is formed in the pocket section and opens through an aperture 103 in roof 95 of the pocket section to provide an access port 104 into connector cavity 85.

A pivot shaft 106 is pivotally mounted on bearing structures 108 on body 94. The gate-to-shaft connector cavity 85 formed in the body 94 opens into pocket cavity 102 through an access port 104 through which a connector neck portion 105 of said gate 88 can extend into connector cavity 85 to a connection point 107 on pivot shaft 106. It is noted that in the embodiment shown, the gate apex 15 is allowed to be pivoted up against 116 of the pocket cavity ceiling or inner surface of the tubular pipe wall where a pocket is not provided, to a non-blocking position 119 even though the connection point 107 of the connector neck portion 105 to the shaft 106 is external to the pocket cavity 102 or the internal surface of pipe. The eccentric connector structure which allows this gate action is the provision of an eccentric arm or measure 109 which in the embodiment shown in FIG. 29, has the length or measure approximately equal to the distance from the pivot axis 111 of shaft 106 to the plane 113 of the pocket cavity ceiling or pipe inner wall 116. In order to maximize the effectiveness of the present invention, the minimum depth "D" of the pocket cavity 102 is determined by the functional thickness "FT" of the gate 88 as shown in FIG. 28 wherein gap 117 is shown for clarity of the drawing. The "FT" is measured from the line "S" to the pocket cavity ceiling or pipe inner wall surface 116, wherein the line "S" subtends the ceiling arc length and radius which is required to accommodate the maximum width "W" of the gate, flat or curved.

A gate positioning control structure generally designated 120 is provided on said throttle unit for providing predetermined degrees of rotation of the pivot shaft in response to the magnitude of fluid flow pressure forces "PF" directed against said gate. Such a structure is shown for example, as a torsion spring 112 which is mounted on a journal 122 on pivot body 94. The stationary end 124 of the spring engages in shoulder gap 126 on body 94 and the torsion force adjustment end 128 of the spring engages in shoulder slot 130 on spring retainer cap 132. In assembling the structure 120, the torsion spring is slid onto journal 122 with spring end 124 engaged in gap 126 on said body. Cap 132 is then slid over the spring with the end 125 of shaft 106 slid through aperture 134 in the cap and with adjustment end 128 of the spring positioned in slot 130 in the cap. The cap is then rotated in a direction tending to unwind the spring a predetermined degree, which degree will place the gate at the desired initial generally lateral flow blocking posture relative to the fluid flow path. The end 125 of shaft 106 is then affixed, e.g., by welding as at 127 to cap 132. Dust cap 133 is placed over the other end of body 94 and secured in place thereon as by welding. In operation of structure 120, the exhaust gas flow forces generated during engine operation will begin to pivot the gate from its initial flow attenuating posture at a predesigned lower engine speed and/or load, and then to completely pivot the gate out of the exhaust gas flow path at a predesigned upper engine speed and/or load. It is noted that the torsion strength characteristics of the spring, the circumferential positions of the spring ends 124, 128 at rest, the location of gap 126 on pivot body 94, and the circumferential position of slot 130 in cap 132, preferably are all coordinated with the desired initial posture of the gate within the flow path such that the spring will impose a substantially linear torsion resistance force against further opening of the gate in response to a substantially linear progressive increase in flow pressure forces "PF" against the gate.

The present invention is not limited to the use of such a torsion spring, and other such gate position control means can be used such as an electronic control system as disclosed, for example in U.S. Pat. No. 6,085,722 the disclosure of which is hereby incorporated herein by reference in its entirety.

In the above preferred embodiments the gate pivot shaft and its mounting bearings are located entirely out of the exhaust pipe flow path including the pocket cavity. This structure of the remote gate-to-shaft connection point minimizes, for example, heat and exhaust gas corrosion and exhaust gas force damage of the shaft and bearings.

The invention has been described in detail with particular reference to preferred embodiments thereof, but it will be understood that variations and modifications will be effected within the spirit and scope of the invention.

I claim:

1. An exhaust gas throttle unit for an internal combustion engine, said unit comprising a tubular wall of a section of exhaust pipe section of an internal combustion engine, said tubular wall having an inner cylindrical surface of uniform diameter having open ends and an exhaust gas flow passage extending therethrough along a longitudinal axis of said inner cylindrical surface, a gate plate access opening is formed through said tubular wall and opens into said flow passage, a housing wall structure extends outwardly from said tubular wall and overlies said access opening and is formed to provide a sealed pocket cavity on an exterior portion of said tubular wall, which pocket cavity comprises a pivot section and a gate plate stop recess (102) having a stop ceiling (116), a gate plate having a concave side and a convex side is provided having a width component ("W"), a functional plane, an apex surface and a thickness dimension, a gate plate pivot shaft is rotationally mounted in said pivot section and having a rotation axis positioned exteriorly of said exhaust gas flow passage and being oriented normal to said longitudinal axis of said pipe section, a torsion spring having first and second ends, said first end being affixed to said pivot section housing and said second end being affixed to said pivot shaft, said torsion spring being operable to resist pivoting of said pivot shaft and opening of said gate plate toward said pipe section tubular wall to an increasing degree as exhaust gas pressure forces ("PF") against said width component ("W") of said gate plate increase, said gate plate having a longitudinal axis (32A) and a lateral axis (32B), and further having a connection neck portion extending outwardly from a peripheral edge portion of said gate plate generally along said longitudinal axis of said gate plate and extending through said access opening, said neck portion being affixed to said pivot shaft at a connection point on said pivot shaft which is laterally offset an eccentric measure (109) from said rotation axis of said pivot shaft, said connection point of said gate plate to said pivot shaft orients said width ("W") component of said gate plate normal to gas flow pressure forces ("PF") against said gate plate width component ("W") whereby said component ("W") is also laterally offset by said eccentric measure from said pivot shaft rotation axis, and wherein said eccentric measure is substantially the same as the measure from said stop ceiling of said stop recess to said pivot shaft rotation axis, whereby said convex side of said gate plate will lie adjacent to said stop ceiling when said gate plate is in its full open position.

2. The unit of claim 1 wherein the diameter of said pivot shaft is dimensioned to allow a laterally curved gate plate member which is affixed to said shaft at said connection point on the surface of said pivot shaft to pivot up adjacent to said tubular wall.

3. The unit of claim 1 wherein said stop recess comprises a radially outward formed indentation in said inner cylindrical surface of said tubular wall, wherein said stop recess is dimensioned and configured to receive a gate plate in its wide open pivoted position, whereby said gate plate in said wide open pivoted position lies outside of said gas flow passage.

4. The unit of claim 1 wherein said stop ceiling of said stop recess is concavely formed substantially on the same radius as the convex side of said gate plate.

5. The unit of claim 1 wherein said longitudinal axis of said gate plate is substantially parallel to said longitudinal axis of said inner cylindrical surface when said gate plate is in its full open position in said stop recess.

* * * * *